United States Patent
Liu et al.

(10) Patent No.: US 11,763,497 B2
(45) Date of Patent: Sep. 19, 2023

(54) METHODS AND SYSTEMS FOR GENERATING SIMULATED DATASETS FOR FISHEYE CAMERA APPLICATIONS

(71) Applicant: TOYOTA MOTOR ENGINEERING & MANUFACTURING NORTH AMERICA, INC., Plano, TX (US)

(72) Inventors: Yongkang Liu, Plano, TX (US); Xuewei Qi, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/505,344

(22) Filed: Oct. 19, 2021

(65) Prior Publication Data
US 2023/0118817 A1    Apr. 20, 2023

(51) Int. Cl.
*G06T 11/00*    (2006.01)
*G06T 3/00*    (2006.01)

(52) U.S. Cl.
CPC ............ *G06T 11/00* (2013.01); *G06T 3/0093* (2013.01)

(58) Field of Classification Search
CPC ............................. G06T 11/00; G06T 3/0093
See application file for complete search history.

(56) References Cited

U.S. PATENT DOCUMENTS

| | | | |
|---|---|---|---|
| 7,650,013 B2 | 1/2010 | Dietsch et al. | |
| 9,740,944 B2 | 8/2017 | Micks et al. | |
| 9,866,752 B2 | 1/2018 | Zhang et al. | |
| 9,950,667 B2 * | 4/2018 | Lee ........................ | G06V 20/58 |
| 10,460,208 B1 * | 10/2019 | Atsmon ................. | G06V 20/64 |
| 2008/0069403 A1 * | 3/2008 | Breed ................... | B60K 28/066 |
| | | | 382/104 |
| 2014/0072213 A1 * | 3/2014 | Paiton ................... | G06F 18/253 |
| | | | 382/165 |
| 2020/0090303 A1 * | 3/2020 | Zhang ........................ | G06T 3/00 |
| 2021/0049772 A1 * | 2/2021 | Buibas ............... | G06Q 30/0601 |
| 2021/0150187 A1 * | 5/2021 | Karras ................... | G06N 3/045 |
| 2021/0287050 A1 * | 9/2021 | Kar ....................... | G06V 10/774 |

FOREIGN PATENT DOCUMENTS

| | | |
|---|---|---|
| CN | 102831386 A | 12/2012 |
| WO | 2020180755 A1 | 9/2020 |
| WO | 2021133847 A1 | 7/2021 |

* cited by examiner

*Primary Examiner* — Michael Le
(74) *Attorney, Agent, or Firm* — Dinsmore & Shohl LLP

(57) ABSTRACT

A method for generating a dataset is provided. The method includes generating, within a simulated environment, a simulated image including one or more distortions, the simulated image includes a plurality of vehicles, generating vehicle image patches and ground truth from the simulated image, performing, using a style transfer module, a style-transfer operation on the vehicle image patches, combining the vehicle image patches, on which the style-transfer operation is performed, with a background image of a real-world location, and generating a dataset based on the ground truth and the combination of the vehicle image patches and the background image.

20 Claims, 7 Drawing Sheets

_US 11,763,497 B2_

METHODS AND SYSTEMS FOR GENERATING SIMULATED DATASETS FOR FISHEYE CAMERA APPLICATIONS

TECHNICAL FIELD

The embodiments described herein relate to generating a dataset, and more specifically, to generating a dataset based on ground truth and a combination of vehicle image patches generated from a simulated image that includes one or more distortions and a background image of a real-world location.

BACKGROUND

Various methods and techniques of training vehicle detection models using synthetic images are present. However, these methods and techniques have numerous limitations, namely that these techniques require random sampling of intrinsic and extrinsic data in order to generate images, which cause inconsistences and distortions between foregrounds and backgrounds of the generated images. Other techniques involve the use of shapes to detect and identify objects in images. For example, these techniques involve the use of shapes such as bounding boxes, ellipses, generic polygons that may be positioned around perimeters of one or more objects included within these images. However, these techniques involve significant human annotation. When such annotations are performed across a large and diverse dataset, the process is cost and resource intensive. Moreover, accurately utilizing bounding boxes, using these techniques, to identify objects across multiple planes also presents a challenge.

Accordingly, a need exists for a method and system for facilitating the generation of a large-scale and robust datasets for various applications, e.g., applications that are related to images captured by fisheye cameras.

SUMMARY

In one embodiment, a method for generating a dataset is provided. The method includes generating, within a simulated environment, a simulated image including one or more distortions, the simulated image includes a plurality of vehicles, generating vehicle image patches and ground truth from the simulated image, performing a style-transfer operation on the vehicle image patches, combining the vehicle image patches, on which the style-transfer operation is performed, with a background image of a real-world location, and generating a dataset based on the ground truth and the combination of the vehicle image patches and the background image.

In another embodiment, a system for generating a dataset is provided. The system comprises a processor that is configured to generate, within a simulated environment, a simulated image including one or more distortions, the simulated image includes a plurality of vehicles, generate vehicle image patches and ground truth from the simulated image, perform a style-transfer operation on the vehicle image patches, combine the vehicle image patches, on which the style-transfer operation is performed, with a background image of a real-world location, and generate a dataset based on the ground truth and the combination of the vehicle image patches and the background image.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein describe a system and method for generating a dataset based on ground truth and a combination of vehicle image patches and a background image of a real-world location. As stated above, current techniques of training models with the use of synthetic or simulates images suffer from numerous deficiencies. In particular, these techniques cause content distortions and inconsistences in images and require human annotation across large and diverse datasets, which reduces efficiency. Moreover, these techniques do not facilitate the generation of accurate datasets that are useful for certain applications, e.g., applications associated with images captured by fisheye cameras.

To address and overcome these limitations, the present disclosure describes a system that is configured to generate, within a simulated environment, a simulated image including one or more distortions, the simulated image includes a plurality of vehicles, generating vehicle image patches and ground truth from the simulated image, performing a style-transfer operation on the vehicle image patches, combining the vehicle image patches, on which the style-transfer operation is performed, with a background image of a real-world location, and generate a dataset based on the ground truth and the combination of the vehicle image patches and the background image.

Figure 1:
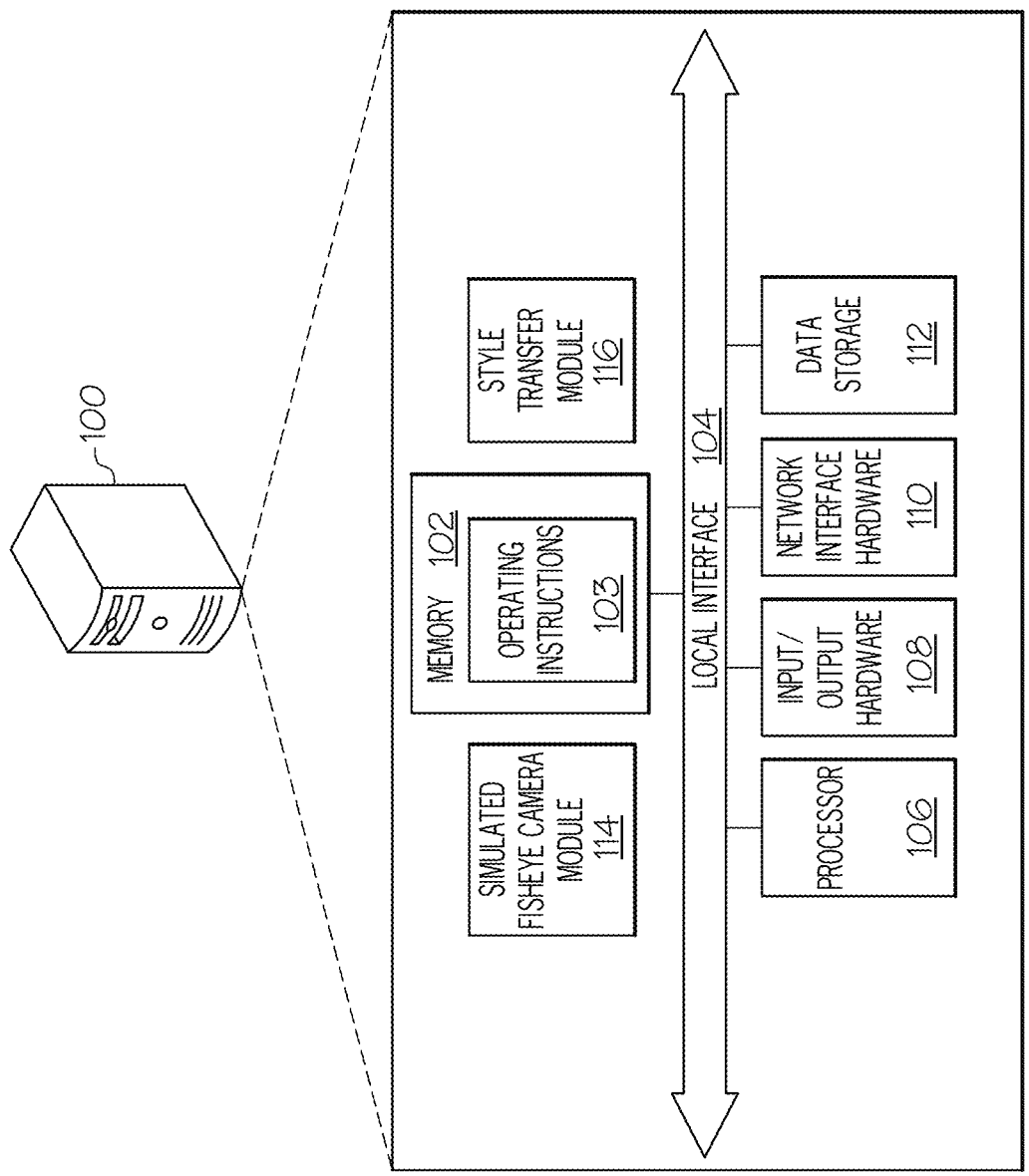
FIG. 1 depicts a non-limiting example of a computing device that is configured to perform one or more of the features and functionalities described in the present disclosure, according to one or more embodiments described and illustrated herein.

FIG. 1 depicts a non-limiting example of a computing device 100 that is configured to perform one or more of the features and functionalities described in the present disclosure, according to one or more embodiments described and illustrated herein. As illustrated, the computing device 100 includes a processor 106, input/output hardware 108, a network interface hardware 110, a data storage component 112, and memory 102. The memory 102 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device 100 and/or a device that is external to the computing device 100.

The memory 102 may store operating instructions 103, each of which may be embodied as a computer program, firmware, and so forth. The memory 102 may comprise RAM, ROM, flash memories, hard drives, or any device capable of storing the operating instructions 103 such that the operating instructions 103 can be accessed by the processor 106. The operating instructions 103 may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the memory 102. Alternatively, the operating instructions 103 may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The processor 106 along with the memory 102 may operate as a controller for the computing device 100.

The memory 102 includes a simulation module for generating simulated images using a simulated camera such as a simulated fisheye cameras. The memory 102 may also include a style transfer module, which will be described in detail below. The memory 102 may store simulated images as well as real world images that are captured by cameras, such as fisheye cameras.

A local interface 104 is also included in FIG. 1 and may be implemented as a bus or other communication interface to facilitate communication among the components of the computing device 100. The processor 106 may include any processing component operable to receive and execute instructions 103 from the memory 102 (such as from a data storage component 136 and/or the memory 102). Accordingly, each of the one or more processors 202 may be a controller, an integrated circuit, a microchip, a computer, or any other computing device. As described above, the input/output hardware 108 may include and/or be configured to interface with speakers, microphones, and/or other input/output components.

The operating instructions 103 may include an operating system and/or other software for managing components of the computing device 100. It should be understood that while the component in FIG. 1 are illustrated as residing within the computing device 100, this is merely an example. In some embodiments, one or more of the components may reside external to the computing device 100 or within other devices. It should be understood that, while the computing device 100 is illustrated as a single device, this is also merely an example. As an example, one or more of the functionalities and/or components described herein may be provided by the computing device 100. Depending on the particular embodiments, any of these device may have similar components as those depicted in FIG. 1. To this end, any of these devices may include instructions for performing the functionality described herein.

Figure 2:
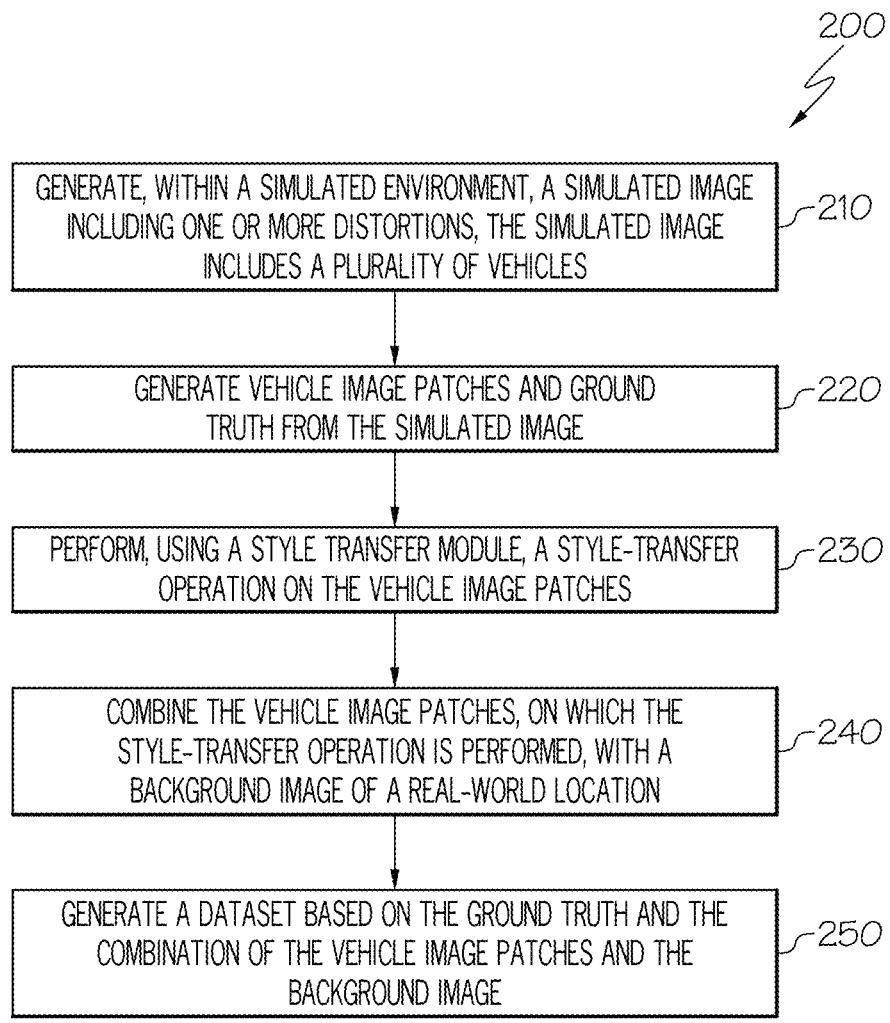
FIG. 2 depicts a flow chart for generating a dataset based on ground truth and a combination of vehicle image patches and a background of a real-world location, according to one or more embodiments described and illustrated herein.

FIG. 2 depicts a flow chart 200 for generating a dataset based on ground truth and a combination of vehicle image patches and a background of a real-world location, according to one or more embodiments described and illustrated herein.

In step 210, the computing device 100 may generate, within a simulated environment, a simulated image including one or more distortions, the simulated image includes a plurality of vehicles. In embodiments, the simulated image may be generated within the simulated environment using a simulated camera and the ground truth may be associated with the vehicle image patches in the simulated image. The ground truth may be information about the vehicle image patches included in the simulated image. For example, in FIG. 5, the computing device 100 stores ground truth for distorted vehicle image patches. The ground truth is stored in association with the simulated image such that the final simulated image obtained in step 240 and the ground truth may be utilized to train and evaluate various fisheye camera application models such as object detection, localization, and instance segmentation.

Figure 5:
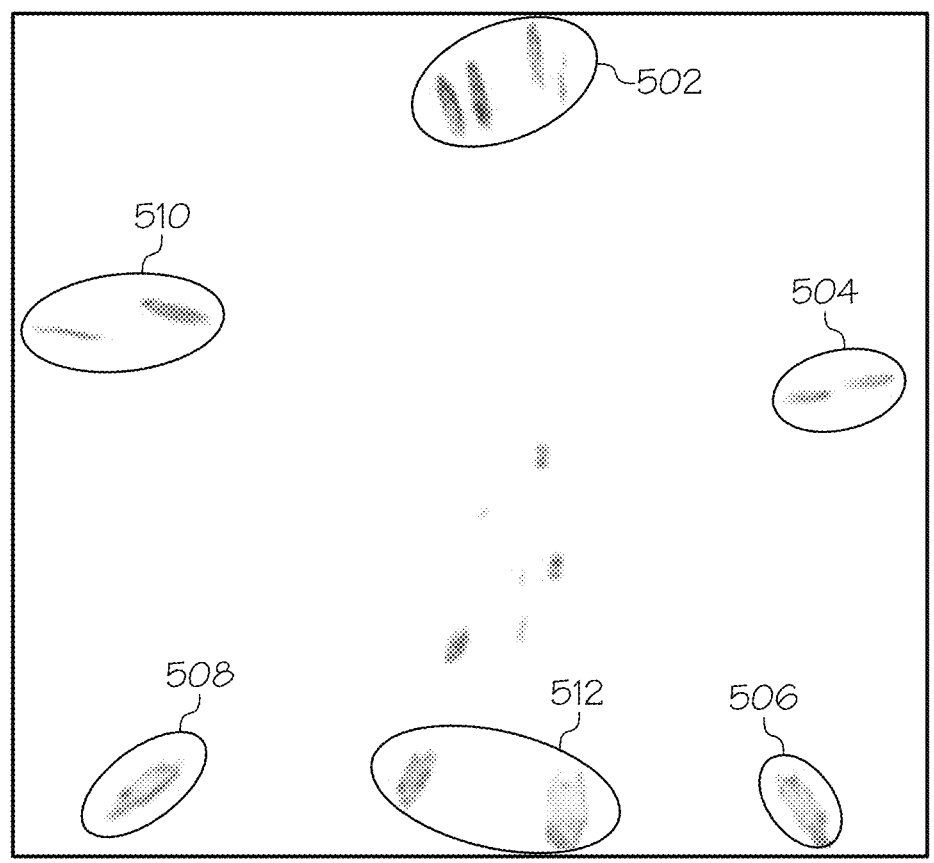
FIG. 5 depicts an example simulated image with a plurality of simulated vehicle image patches included as part of a simulated environment, according to one or more embodiments described and illustrated herein.

The simulated camera that is utilized to generate a simulated image with one or more distortions may be implemented by the processor 106 executing one or more operating instructions 102. The simulated camera may be a fisheye camera, and the one or more distortions exist because the simulated image is generated by the simulated fisheye camera. For example, the vehicle patches in the simulated image of FIG. 5 are distorted because the simulated image is generated by a simulated fisheye camera. Specifically, the vehicle patches in the periphery of the simulated fisheye camera appear to be elongated in a radial direction.

In some embodiments, the one or more distortions included within the simulated image may refer to a blurring, an exaggeration of digital content within the image, a disproportionate depiction of one or more objects within the image, and so forth. In short, distortions refer to disproportionate representations of one or more objects in an image, blurring or aberrations of one or more portions of an image, and so forth. In embodiments, the simulated image may be a bird's-eye-view image. In embodiments, the simulated image may include objects in the form of one or more vehicles with distortions and may also a simulated background with one or more distortions.

In step 220, the computing device 100 may generate vehicle image patches and ground truth from the simulated image. Each of these patches may include one or more objects, e.g., vehicles or portions of vehicles. In embodiments, as part of generating the vehicle image patches as described above, the simulated background of the simulated image may be removed. Because of the nature of simulating images, it is easy to identify background of the image excluding vehicles in the images. As a result of the elimination or removal of the simulated background, the vehicle image patches may be obtained. In some embodiments, the computing device 100 may generate images patches other than vehicle image patches. For example, the computing device may generate any moving object image patches such as pedestrian image patches, bicycle image patches, animal image patches, and the like.

In step 230, the computing device 100 may perform a style transfer operation on the vehicle image patches that may be generated from the simulated image. In embodiments, an example implementation of the style transfer operation is described in FIG. 6. In embodiments, the style transfer operation may be performed by a style transfer module. The style transfer module may be trained using real-world vehicle patches. The details of obtaining real-world vehicle patches will be described below with reference to FIG. 3 below. Once the style transfer module is sufficiently trained, the trained style transfer module may be utilized to transform the vehicle image patches obtained in step 220 to vehicle image patches that are closer to real-world vehicle images. In embodiments, a result of the performing of the style transfer operation is that the style transfer module generates a set of vehicle image patches that include one or more objects (e.g., vehicles) that have a realistic appearance.

In step 240, the computing device 100 may combine the vehicle image patches, on which the style-transfer operation has already performed, with a background image of a real-world location. In embodiments, the vehicle image patches, as described above, which may be based on a simulated image that includes objects in the form of one or more vehicles without a background of any kind, may be combined with a background image of a real-world location. For example, the background image of a real-world location may correspond with a roadway such as a highway or a busy street with traffic lights, stop signs, and so forth.

In step 250, the computing device 100 may generate a dataset based on the ground truth and the combination of the vehicle image patches and the background image. In embodiments, the dataset that is generated may be based on a combination of style transferred vehicle image patches, which have a realistic appearance, and which are combined with a background of a real world location, and ground truth associated with the vehicle image patches. The computing device 100 may repeat the process of steps 210 through 240 such that the dataset may include a plurality of simulated images with ground truth for objects included in each of the simulated images. In this regard, the computing device 100 may generate a large-scale dataset of simulated images for fisheye camera applications without obtaining real world images and manually tagging objects in the real world images. The generated dataset may be used to train and evaluate various fisheye camera application models such as object detection, localization, and instance segmentation.

Figure 3:
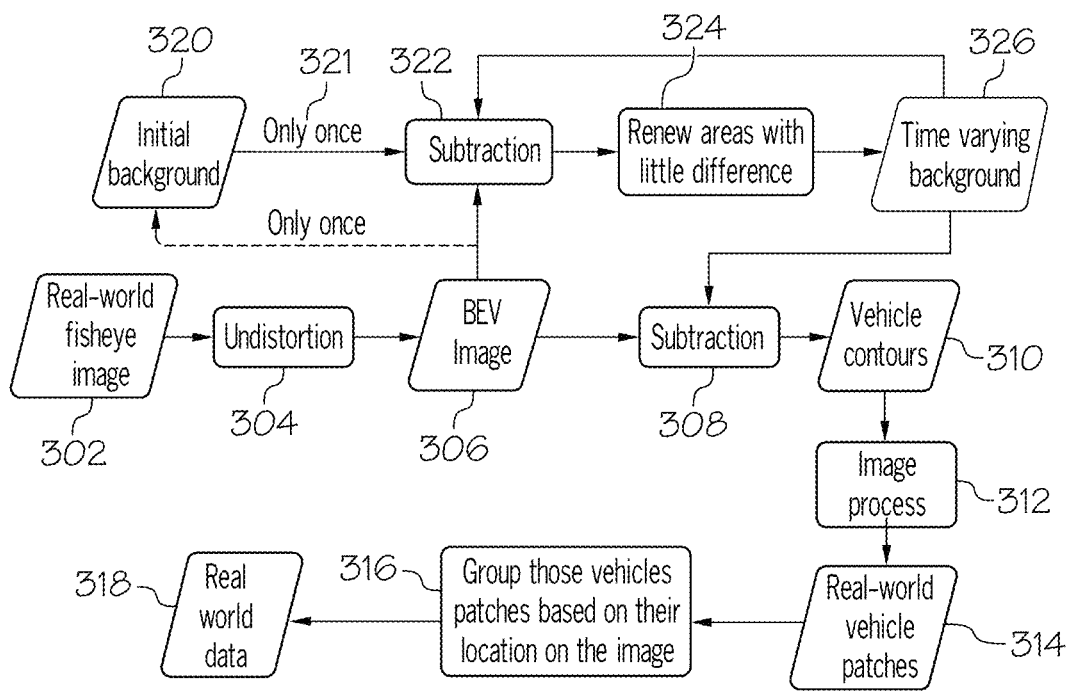
FIG. 3 depicts an example flow chart for obtaining real world vehicle patches that may be used for training of the style transfer module as described above, according to one or more embodiments described and illustrated herein.

FIG. 3 depicts an example flow chart for obtaining real world vehicle patches that may be used for training of the style transfer module as described above, according to one or more embodiments described and illustrated herein. For example, in embodiments, the computing device 100 may access a plurality of real world images (e.g., obtaining fisheye images associated with a real-world environment) associated with a real-world environment, which may be acquired from one or more fisheye cameras, as described in block 302. Fisheye cameras are ultra-wide lens based cameras that enable the capture of images that include significant visual distortion and create a wide panoramic or hemispherical image. The fisheye cameras may be designed to have a lens with a significantly convex angle such that images may be captured within a 180 degree range. In embodiments, the range of image capture may exceed 180 degrees. The plurality of real world images that are acquired from the one or more fisheye cameras may include objects in the form of one or more vehicles, and these images may include one or more distortions. As described above, examples of the one or more distortions may include disproportionate sizes of one or more vehicles included within the images, blurring of the one or more vehicles, and so forth. Other examples of distortions are also contemplated.

Additionally, as part of the training of the style transfer module, the one or more distortions may be removed from the real-world fisheye images using one or more manual calibration or automatic calibration techniques, as described in block 304. Thereafter, in embodiments, in block 306, a bird's eye view image may be generated from the real-world fisheye images, and the generated bird's eye view image may be input into or included as part of two separate and parallel processes. These parallel processes include background image updating and background subtraction. As part of the background image updating process, the bird's eye view image may be utilized to generate an initial background image in which no vehicles are included, as describe in block 320. From this step, the background image updating process includes the step of determining differences between the generated initial background image and the bird's eye view image generated in block 306. In embodiments, areas comprising large differences between these two images are determined as corresponding to vehicles, and as such, area comprising small differences (block 322) between these two images are identified and utilized to renew (block 324) and generate time varying backgrounds (i.e., obtaining time varying backgrounds) (block 326). These time varying backgrounds are utilized to identify backgrounds for subtraction (block 308) from the bird's eye view image (block 306).

Additionally, as part of the background subtraction process, the time varying backgrounds that were identified (in block 306) are subtracted from the bird's eye view image, as a result of which vehicle contours are obtained, as described in block 310. In other words, time varying backgrounds may be subtracted from the respective time varying backgrounds from the fisheye images to obtain a set of fisheye-vehicle image patches. Thereafter, in embodiments, as part of the background subtraction process, vehicle contours that are obtained may be further filtered or processed using a combination of morphological transformation operations and concave point detection operations that are performed for the purpose of generating accurate vehicle image patches (e.g., fisheye-vehicle image patches) (block 314). Additionally, these fisheye-vehicle image patches may be grouped based on their locations on the bird's eye view image (block 316). The grouping of the fisheye-vehicle image patches based on their locations facilitates the generation of real world data, as described in block 318.

The real world data obtained in block 318 may be utilized to train the style transfer module described above. In embodiments, the training of the style transfer module may be implemented based on the grouping generated in block 316. Specifically, that the training of the style transfer module is based on relative locations of the fisheye vehicle image patches on corresponding real-world fisheye images associated with the real-world environment and degrees of distortions of the fisheye vehicle image patches. By referring to FIG. 4, the vehicle image patches are grouped into different groups such as clusters 402, 404, 406, 408 based the locations of the vehicle image patches. Different groups have different levels/shapes of distortions depending on their relative locations in the simulated image. Additionally, the relative locations of the fisheye vehicle image patches may be associated with distances from centers of the corresponding fisheye images and angles associated with the centers of the corresponding fisheye images. For example, the vehicle image patches in the cluster 402 are elongated toward an upper left direction where as the vehicle image patches in the clusters 406 or 408 are elongated toward in a lower right direction.

Figure 4:
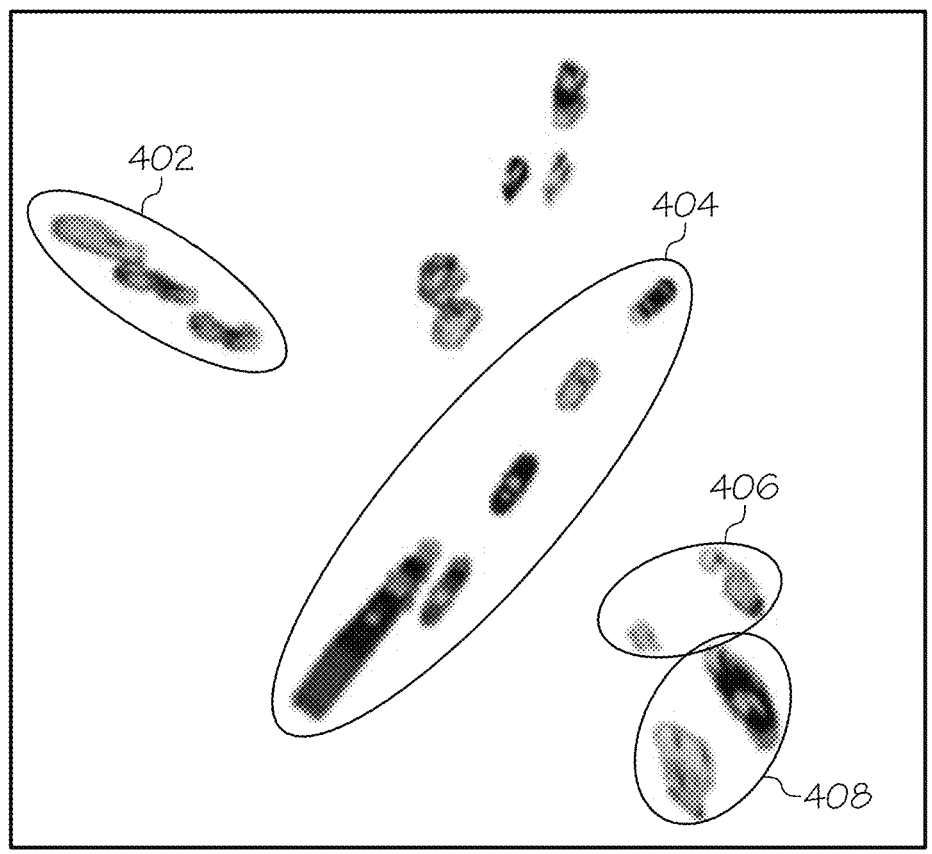
FIG. 4 depicts an example image including a plurality of real world fisheye vehicle image patches, according to one or more embodiments described and illustrated herein.

FIG. 4 depicts an example image including a plurality of real world fisheye vehicle image patches, according to one or more embodiments described and illustrated herein. As depicted in FIG. 4, a plurality of objects, e.g., one or more vehicles, located within various parts of the example image. Additionally, as illustrated, the one or more vehicles may be grouped based on their location on the image. For example, objects or vehicles may be grouped together in cluster 402 based on being located in the top left portion of the example image and being located within a certain proximity with respect to each other, while another set of one or more vehicles may be grouped together in cluster 404 based on being located primarily in the center of the example image and without a certain proximity of each other. Clusters 406 and 408 may include similarly grouped objects. It is noted that clusters 402, 406, and 408 may include objects that are distorted. In particular, one or more objects in clusters 402, 406, and 408 are blurred and/or include portions that are disproportionately large compared to the other portions. In contrast, the cluster 404 includes one or more objects that appear largely undistorted.

FIG. 5 depicts an example simulated image with a plurality of simulated vehicle image patches included as part of a simulated environment, according to one or more embodiments described and illustrated herein. In particular, FIG. 5 depicts a simulated environment that is similar to the environment depicted in FIG. 4. In embodiments, as described above, a simulated fisheye camera may be utilized to generate the example simulated image depicted in FIG. 5. Additionally, as a simulated fisheye camera may be implemented as a result of the computing device 100 executing one or more operating instructions 102, the example simulated image of FIG. 5 may be generated so as to exclude a background of any kind. For example, the background (or lack thereof) in FIG. 5 may be such that the objects in the form of vehicles may be included on various portions of the example image and appear as dark objects against a white background. The simulated image in FIG. 5 may be transformed by the style transfer module to obtain realistic looking vehicle patches as shown in steps 712 and 714 of FIG. 7. Then, a background image of a real world location may be added to the transformed simulated vehicle patches, as shown in step 716 of FIG. 7. Additionally, the one or more objects (e.g., vehicle image patches) may be grouped together in clusters 502, 504, 506, 508, 510, and 512 based on their respective locations on the example image and being located with a certain proximity of each other.

Figure 6:
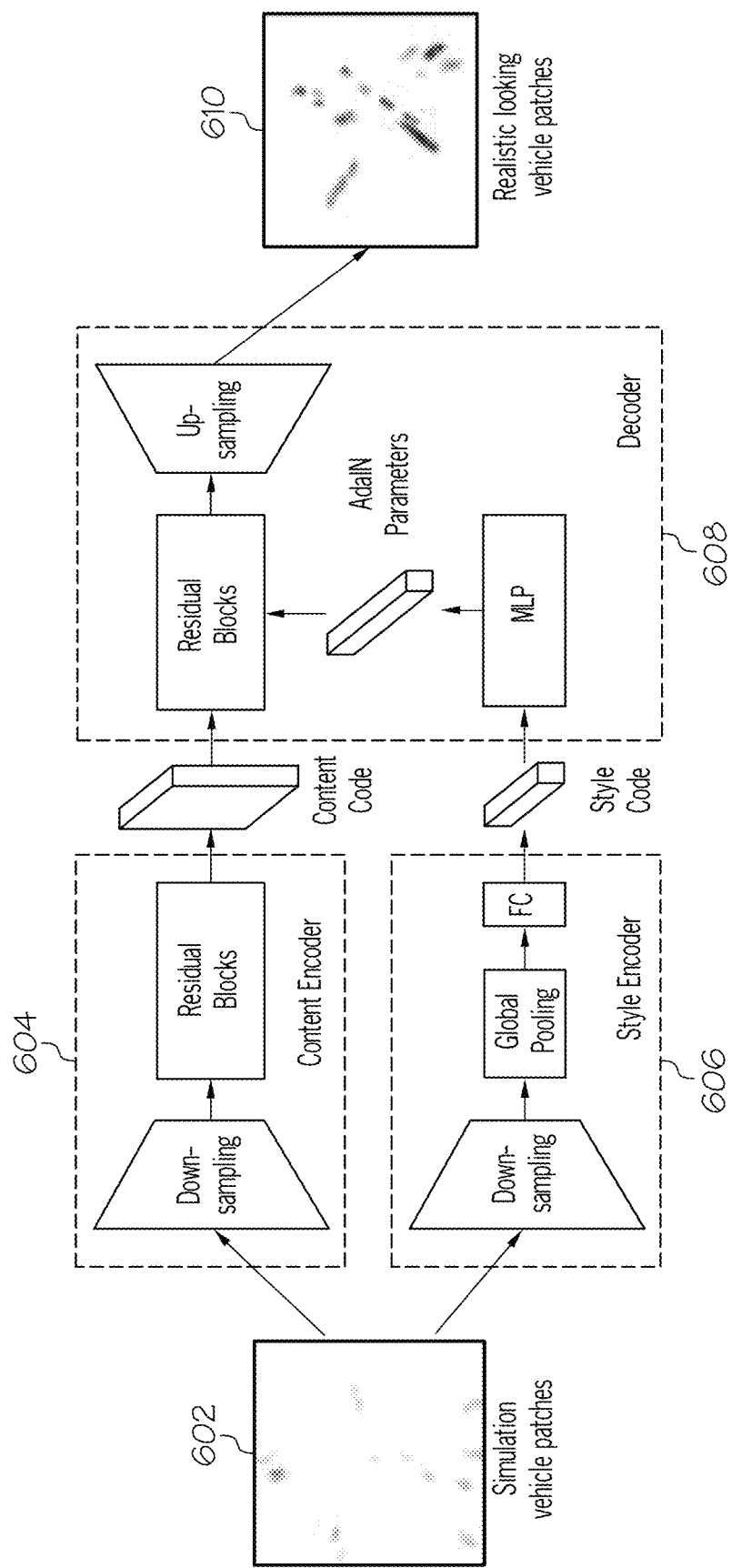
FIG. 6 depicts an example style transfer framework that may be utilized for training the style transfer module as described in the present disclosure, according to one or more embodiments described and illustrated herein.

FIG. 6 depicts an example style transfer framework that may be utilized for training the style transfer module as described in the present disclosure, according to one or more embodiments described and illustrated herein. The training of the style transfer module enables for the implementation of a style transfer process that reduces distances between vehicle image patches that are generated from a simulated image and vehicle image patches that are generated or derived from real-world fisheye vehicle image patches derived from fisheye images captured from a real-world environment. It is noted that the training of the style transfer module may be performed using a generative adversarial network based model (GAN models) such as, e.g., (Recycle GAN, CycleGAN, MUNIT, etc.). In embodiments, the CycleGAN may include two residential translation network trained with adversarial loss and cycle reconstruction loss. It is noted that, during both training and testing, a dropout process may be utilized. In other embodiments, a BicycleGAN may be utilized. The BicycleGAN involves an image-to-image translation model that generates continuous and multimodal output distributions and requires training data that is paired.

In FIG. 6, a plurality of simulated vehicle image patches, which may be generated from a simulated image, may be fed into a content encoder 604 and a style encoder 606, respectively. In embodiments, the content encoder may include several strided convolutional layers that are followed by residential blocks. The style encoder may include several strided convolutional layers followed by a global average pooling layer sand a fully connected layer. The output from each of the content encoder 604 and the style encoder 606 may be content code and style code that may be fed into a decoder 608, which decodes and combines the style code and content code for the purpose of generating example vehicle image patches 610 that have a realistic appearance. The decoder 608 includes a multilayer perceptron for producing a set of AdaIN parameters from the style code that is received as an input. Additionally, the content code is processed with the use of residential blocks with AdaIN layers and subsequently decoded to the image space by upsampling and via the use of convolutional layers. The end result is the generation of the example vehicle image patches 610 as illustrated in FIG. 6.

Figure 7:
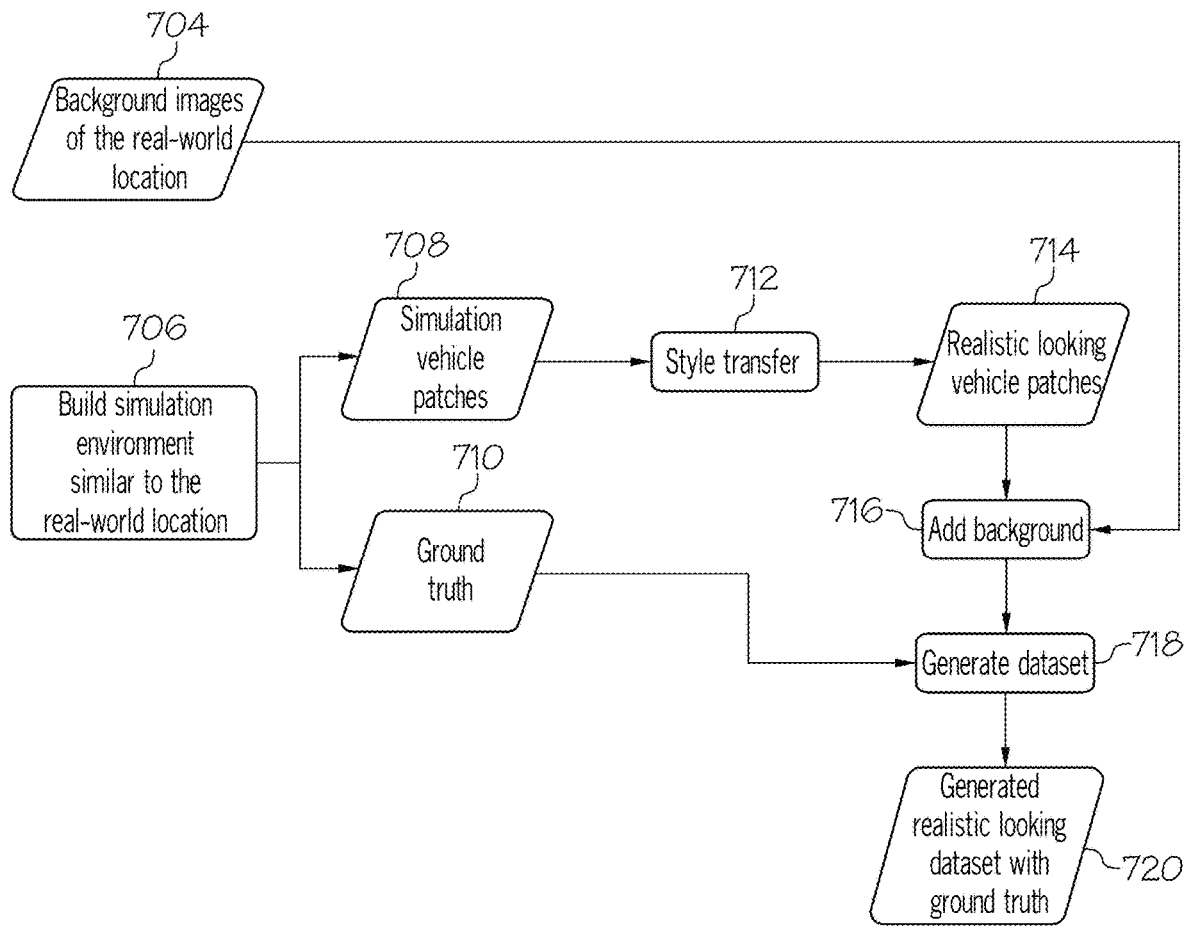
FIG. 7 depicts an example flow chart capturing a process for generating a dataset that includes a set of realistic looking vehicle patches with ground truth.

FIG. 7 depicts an example flow chart capturing an example process 700 for generating a dataset for fisheye camera applications that includes a set of realistic looking vehicle patches with ground truth. In embodiments, the computing device 100 may generate a simulated environment that is similar to and representative of a real-world location (block 706). For example, the simulated environment may include roadways in the form of highways, city streets with traffic lights, street intersections, a plurality of traffic lights included at each intersection, and so forth. A simulated camera may be utilized to generate a simulated image with one or more distortions. The simulated camera may be a fisheye camera, and the one or more distortions exist because the simulated image is generated by the simulated fisheye camera. For example, the vehicle patches in the simulated image of FIG. 5 are distorted because the simulated image is generated by a simulated fisheye camera. Specifically, the vehicle patches in the periphery of the simulated fisheye camera appear to be elongated in a radial direction. In some embodiments, the simulated environment may be utilized to generate a simulated image that includes one or more distortions (e.g., exaggerated forms or blurred forms of one or more objects included in the image). The simulated image that is generated may be such that any background information or data is excluded from the simulated image. The simulated image may include a plurality of objects in the form of one or more vehicles as well.

From the simulated image, simulated vehicle image patches (block 708) and ground truth (block 710) may be generated. The ground truth may be information about the vehicle image patches included in the simulated image. For example, in FIG. 5, the computing device 100 stores ground truth for distorted vehicle image patches. The ground truth is stored in association with the simulated image such that the generated dataset in block 718 and the ground truth may be utilized to train and evaluate various fisheye camera application models such as object detection, localization, and instance segmentation. Regarding the simulated vehicle image patches, because of the nature of simulating images, it is easy to identify background of the image excluding vehicles in the images. In some embodiments, images patches other than vehicle image patches may be generated. For example, the computing device may generate any moving object image patches such as pedestrian image patches, bicycle image patches, animal image patches, and the like.

Additionally, as described above, a style transfer operation (block 712) may be performed on the simulated vehicle image patches in order to generate realistic looking vehicle image patches (block 714). The style transfer operation may be implemented using a style transfer module. The style transfer module may be trained using real world vehicle patches such as real world vehicle image patches illustrated in FIG. 4. Once the style transfer module is sufficiently trained, the trained style transfer module may be utilized to transform the vehicle image patches obtained in block 708 to vehicle image patches that are closer to real-world vehicle images in block 714.

In embodiments, the style transfer operation may be performed in the manner illustrated in FIG. 6 and described above. In particular, by referring to FIG. 6, a content encoder 604 and a style encoder 606 may each receive the simulated vehicle image patches as inputs and generate content code and style code, respectively. Thereafter, the generated content code and style code may be input into a decoder 608, which is configured to process the content code and the style code and output vehicle image patches that have a realistic looking appearance.

Additionally, a background image associated with or of a real-world location may be accessed, e.g., from a real-world fisheye image captured with a fisheye camera (block 704). The background image may then be combined with or incorporated as part of the vehicle image patches having a realistic appearance (block 716). For example, the vehicle image patches may correspond with a plurality objects in the form of vehicles and the background image of the real-world location may correspond with a background in the form of streets, traffic lights, and so forth. Using the combination of the vehicle image patches combined with the background image (block 716) and the ground truth (block 710), a dataset may be generated (block 718). The generated dataset, with the ground truth (block 710), includes data that has a realistic appearance.

While the above process is described with respect to a single simulated image, the computing device may implement the process as to a plurality of simulated images such that the dataset may include a plurality of simulated images with ground truth for objects included in each of the simulated images. In this regard, the computing device 100 may generate a large-scale dataset of simulated images for fisheye camera applications without obtaining real world images and manually tagging objects in the real world images. The generated dataset may be used to train and evaluate various fisheye camera application models such as object detection, localization, and instance segmentation.

It should be understood that the embodiments described herein relate to a method for generating a dataset is provided. The method includes generating, within a simulated environment, a simulated image including one or more distortions, the simulated image includes a plurality of vehicles, generating vehicle image patches and ground truth from the simulated image, performing a style-transfer operation on the vehicle image patches, combining the vehicle image patches, on which the style-transfer operation is performed, with a background image of a real-world location, and generating a dataset based on the ground truth and the combination of the vehicle image patches and the background image.

The computing device generates a large-scale dataset of simulated images for fisheye camera applications without obtaining real world images and manually tagging objects in the real world images. Thus, according to the present disclosure, human annotation is not required for real world fisheye images to identify objects in the real world fisheye images. In addition, according to the present disclosure, ground truths for objects in the simulated images are automatically generated after the simulation setup is done. Furthermore, other ground truth information for different applications (e.g., bounding boxes on the ground plane, pixel-wise segmentation) may be easily obtained from the present simulation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   generating, within a simulated environment, a simulated image including one or more distortions, the simulated image includes a plurality of vehicles;
   generating vehicle image patches and ground truth from the simulated image;
   performing a style-transfer operation trained using real world vehicle patches on the vehicle image patches to obtain style-transferred vehicle image patches including one or more realistic distortions;
   combining the style-transferred vehicle image patches, with a background image of a real-world location; and
   generating a dataset based on the ground truth and the combination of the vehicle image patches and the background image.

2. The method of claim 1, wherein the simulated image within the simulated environment is generated using a simulated camera and the ground truth is associated with the vehicle image patches in the simulated image.

3. The method of claim 1, wherein the simulated image that includes the one or more distortions is a bird's-eye-view image.

4. The method of claim 1, wherein the generating of the vehicle image patches from the simulated image includes eliminating a simulated background included as part of the simulated image.

5. The method of claim 1, wherein the style-transfer operation is based on a generative adversarial network based model.

6. The method of claim 1, wherein the style-transfer operation is performed using a style transfer module.

7. The method of claim 1, further comprising:
   obtaining fisheye images associated with a real-world environment;
   obtaining time varying backgrounds for the fisheye images associated with the real-world environment; and
   subtracting the respective time varying backgrounds from the fisheye images to obtain fisheye vehicle image patches.

8. The method of claim 7, further comprising training the style transfer module using the fisheye vehicle image patches.

9. The method of claim 8, wherein the training of the style transfer module is based on relative locations of the fisheye vehicle image patches on corresponding fisheye images associated with the real-world environment and degrees of distortions of the fisheye vehicle image patches.

10. The method of claim 9, wherein the relative locations of the fisheye vehicle image patches are associated with distances from centers of the corresponding fisheye images and angles associated with the centers of the corresponding fisheye images.

11. A system comprising:
a processor that is configured to:
generate, within a simulated environment, a simulated image including one or more distortions, the simulated image includes a plurality of vehicles;
generate vehicle image patches and ground truth from the simulated image;
perform a style-transfer operation trained using real world vehicle patches on the vehicle image patches to obtain style-transferred vehicle image patches including one or more realistic distortions;
combining the style-transferred vehicle image patches, with a background image of a real-world location; and
generate a dataset based on the ground truth and the combination of the vehicle image patches and the background image.

12. The system of claim 11, wherein the simulated image within the simulated environment is generated using a simulated camera and the ground truth is associated with the vehicle image patches in the simulated image.

13. The system of claim 11, wherein the simulated image that includes the one or more distortions are bird's-eye-view images.

14. The system of claim 11, wherein the processor is configured to generate the vehicle image patches from the simulated image by eliminating a simulated background included as part of the simulated image.

15. The system of claim 11, wherein the processor is further configured to:
obtain fisheye images associated with a real-world environment;
obtain time varying backgrounds for the fisheye images associated with the real-world environment; and
subtract the respective time varying backgrounds from the fisheye images to obtain fisheye vehicle image patches.

16. The system of claim 15, wherein the processor is further configured to train the style transfer module using the fisheye vehicle image patches.

17. The system of claim 16, wherein the training of the style transfer module by the processor is based on locations of the fisheye vehicle image patches on corresponding fisheye images associated with the real-world environment and degrees of distortions of the fisheye vehicle image patches.

18. The system of claim 17, wherein the training of the style transfer module is based on relative locations of the fisheye vehicle image patches on the corresponding fisheye images associated with the real-world environment and degrees of distortions of the fisheye vehicle image patches.

19. The system of claim 18, wherein the relative locations of the fisheye vehicle image patches are associated with distances from centers of the corresponding fisheye images and angles associated with the centers of the corresponding fisheye images.

20. The system of claim 11, wherein the style-transfer operation is based on a generative adversarial network based model.

* * * * *

UNITED STATES PATENT AND TRADEMARK OFFICE
CERTIFICATE OF CORRECTION

PATENT NO. : 11,763,497 B2
APPLICATION NO. : 17/505344
DATED : September 19, 2023
INVENTOR(S) : Yongkang Liu, Xuewei Qi and Kentaro Oguchi It is certified that error appears in the above-identified patent and that said Letters Patent is hereby corrected as shown below:

In the Specification

In Column 1, Line(s) 20, delete "inconsistences" and insert --inconsistencies--, therefor.

In Column 2, Line(s) 45, delete "simulates" and insert --simulated--, therefor.

In Column 2, Line(s) 47, delete "inconsistences" and insert --inconsistencies--, therefor.

In Column 6, Line(s) 57, delete "vehide" and insert --vehicle--, therefor.

In Column 8, Line(s) 16, delete "sand" and insert --and--, therefor.

Signed and Sealed this
Nineteenth Day of March, 2024

Katherine Kelly Vidal
*Director of the United States Patent and Trademark Office*